(12) United States Patent
Di Pietro (10) Patent No.: US 11,070,441 B2
(45) Date of Patent: Jul. 20, 2021

(54) MODEL TRAINING FOR ON-PREMISE EXECUTION IN A NETWORK ASSURANCE SYSTEM

(71) Applicant: Cisco Technology, Inc., San Jose, CA (US)

(72) Inventor: Andrea Di Pietro, Lausanne (CH)

(73) Assignee: Cisco Technology, Inc., San Jose, CA (US)

( * ) Notice: Subject to any disclaimer, the term of this patent is extended or adjusted under 35 U.S.C. 154(b) by 35 days.

(21) Appl. No.: 16/578,565

(22) Filed: Sep. 23, 2019

(65) Prior Publication Data

US 2021/0092026 A1    Mar. 25, 2021

(51) Int. Cl.
*H04L 12/24* (2006.01)
*H04L 29/12* (2006.01)
*G06N 20/00* (2019.01)

(52) U.S. Cl.
CPC ............. *H04L 41/16* (2013.01); *G06N 20/00* (2019.01); *H04L 41/22* (2013.01); *H04L 61/2015* (2013.01)

(58) Field of Classification Search
None
See application file for complete search history.

(56) References Cited

U.S. PATENT DOCUMENTS

| | | |
|---|---|---|
| 2017/0353991 A1 | 12/2017 | Tapia |
| 2018/0144465 A1* | 5/2018 | Hsieh ...................... G06N 3/08 |
| 2018/0307945 A1 | 10/2018 | Haigh et al. |
| 2018/0341876 A1 | 11/2018 | Ghosh et al. |
| 2019/0095756 A1 | 3/2019 | Agrawal et al. |
| 2019/0199605 A1* | 6/2019 | Malboubi ........... H04L 63/1408 |

OTHER PUBLICATIONS

U.S. Appl. No. 15/995,376, Unpublished (filed Jun. 1, 2018), Cisco Technology, Inc.
U.S. Appl. No. 15/880,689, Unpublished (filed Jan. 26, 2018), Cisco Technology, Inc.
U.S. Appl. No. 15/996,645, Unpublished (filed Jun. 4, 2018), Cisco Technology, Inc.
Adnan Khan, "Machine Learning Model Optimization for Intelligent Edge", Medium.com, Jun. 2017, 23 pages.

* cited by examiner

*Primary Examiner* — Brian Whipple
(74) *Attorney, Agent, or Firm* — Behmke Innovation Group LLC; Kenneth J. Heywood; Jonathon P. Western (57) ABSTRACT

In one embodiment, a network assurance service maintains a data lake of network telemetry data obtained by the service from any number of computer networks. The service generates a machine learning model for on-premise execution in a particular computer network to detect network issues in the particular network. To do so, the service repeatedly selects a candidate set of model settings based in part on the data lake of network telemetry data, trains a machine learning model using network telemetry data from the data lake that matches the candidate set of model settings, and tests performance of the trained model using an emulator that emulates network issues in the particular network. The service further deploys the generated machine learning model to the particular computer network for on-premise execution.

20 Claims, 6 Drawing Sheets

MODEL TRAINING FOR ON-PREMISE EXECUTION IN A NETWORK ASSURANCE SYSTEM

TECHNICAL FIELD

The present disclosure relates generally to computer networks, and, more particularly, to model training for on-premise deployment in a network assurance system.

BACKGROUND

Networks are large-scale distributed systems governed by complex dynamics and very large number of parameters. In general, network assurance involves applying analytics to captured network information, to assess the health of the network. For example, a network assurance system may track and assess metrics such as available bandwidth, packet loss, jitter, and the like, to ensure that the experiences of users of the network are not impinged. However, as networks continue to evolve, so too will the number of applications present in a given network, as well as the number of metrics available from the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a network assurance service maintains a data lake of network telemetry data obtained by the service from any number of computer networks. The service generates a machine learning model for on-premise execution in a particular computer network to detect network issues in the particular network. To do so, the service repeatedly selects a candidate set of model settings based in part on the data lake of network telemetry data, trains a machine learning model using network telemetry data from the data lake that matches the candidate set of model settings, and tests performance of the trained model using an emulator that emulates network issues in the particular network. The service further deploys the generated machine learning model to the particular computer network for on-premise execution.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
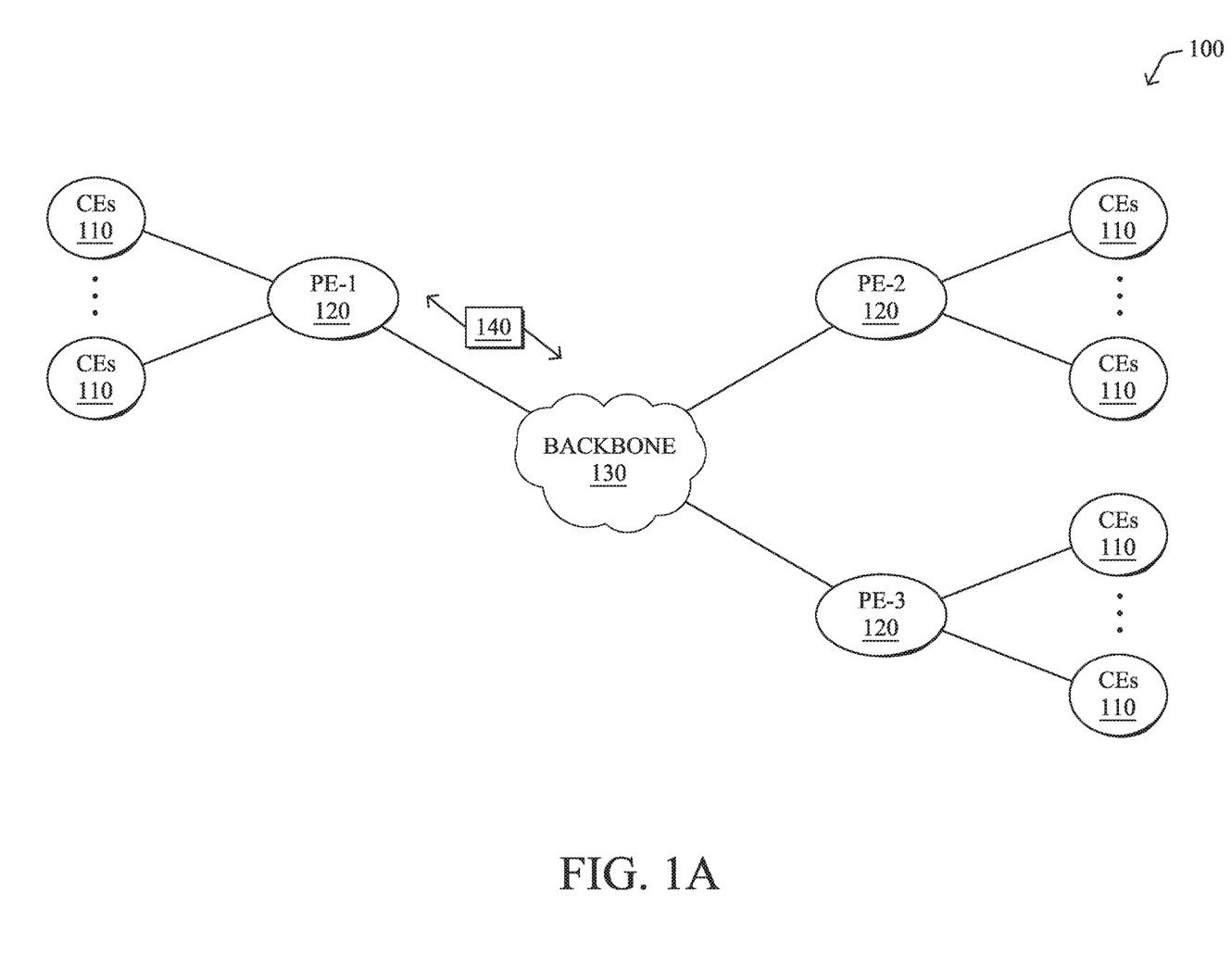
FIGS. 1A-1B illustrate an example computer network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers) via a single CE router, with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
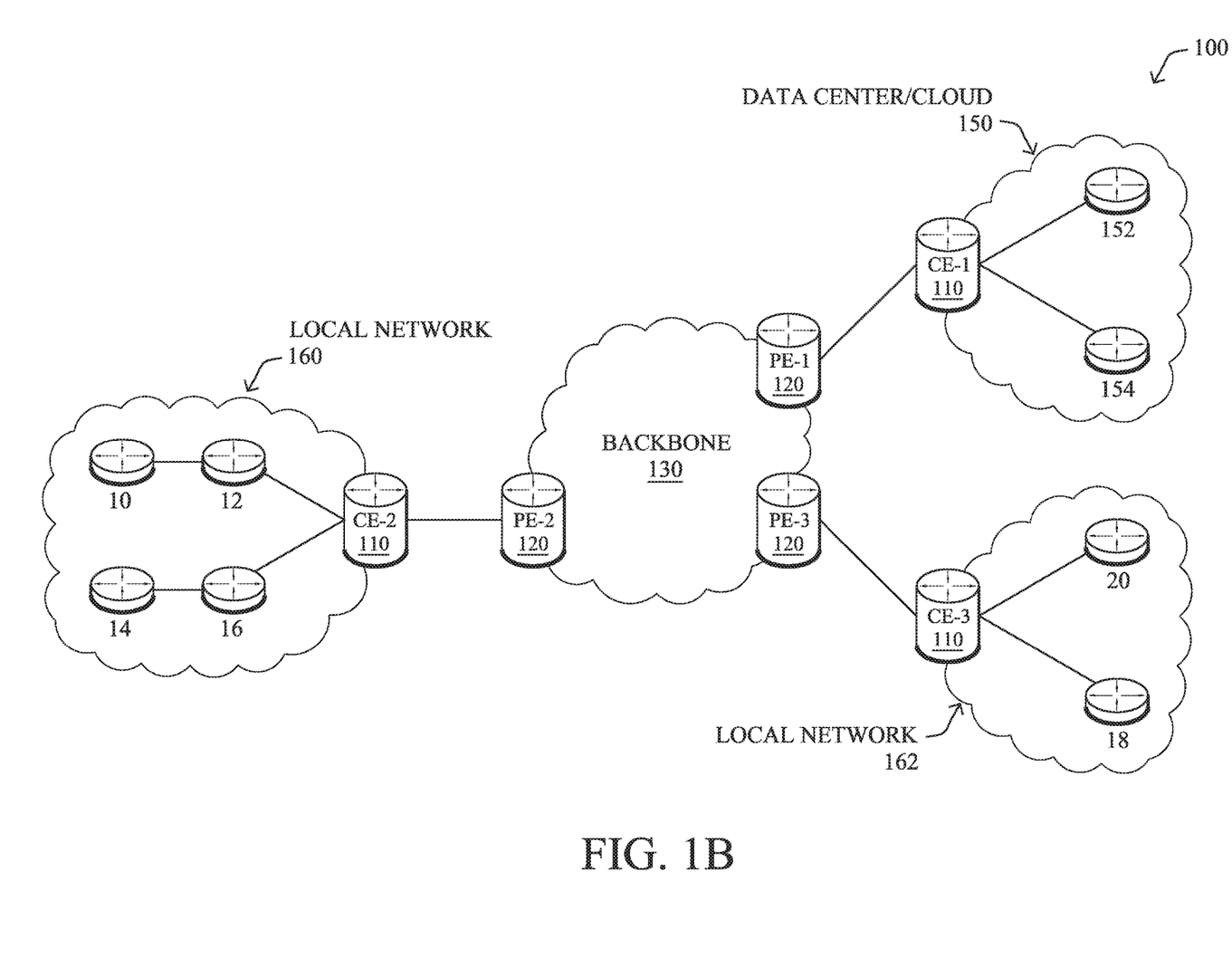

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
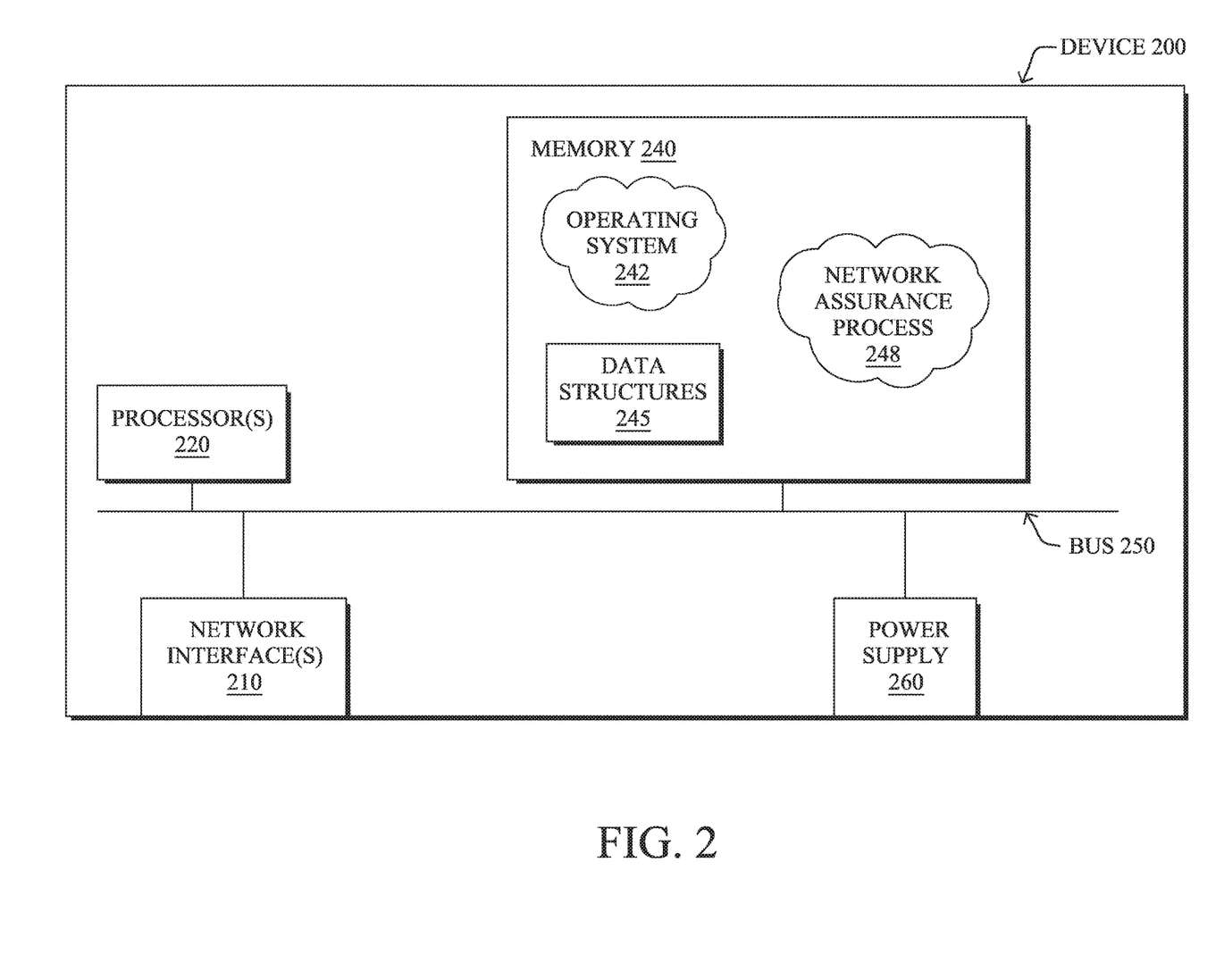
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network assurance process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network assurance process 248 includes computer executable instructions that, when executed by processor(s) 220, cause device 200 to perform network assurance functions as part of a network assurance infrastructure within the network. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

In some embodiments, network assurance process 248 may use any number of predefined health status rules, to enforce policies and to monitor the health of the network, in view of the observed conditions of the network. For example, one rule may be related to maintaining the service usage peak on a weekly and/or daily basis and specify that if the monitored usage variable exceeds more than 10% of the per day peak from the current week AND more than 10% of the last four weekly peaks, an insight alert should be triggered and sent to a user interface.

Another example of a health status rule may involve client transition events in a wireless network. In such cases, whenever there is a failure in any of the transition events, the wireless controller may send a reason_code to the assurance system. To evaluate a rule regarding these conditions, the network assurance system may then group 150 failures into different "buckets" (e.g., Association, Authentication, Mobility, DHCP, WebAuth, Configuration, Infra, Delete, De-Authorization) and continue to increment these counters per service set identifier (SSID), while performing averaging every five minutes and hourly. The system may also maintain a client association request count per SSID every five minutes and hourly, as well. To trigger the rule, the system may evaluate whether the error count in any bucket has exceeded 20% of the total client association request count for one hour.

In various embodiments, network assurance process 248 may utilize machine learning techniques to enforce policies and/or monitor the health of the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network assurance process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network assurance process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) models, artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted poor performance in the network or the presence of an anomalous condition. Conversely, the false negatives of the model may refer to the number of times the model predicted good performance when, in fact, poor performance occurred. True negatives and positives may refer to the number of times the model correctly predicted whether the performance was good or poor, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
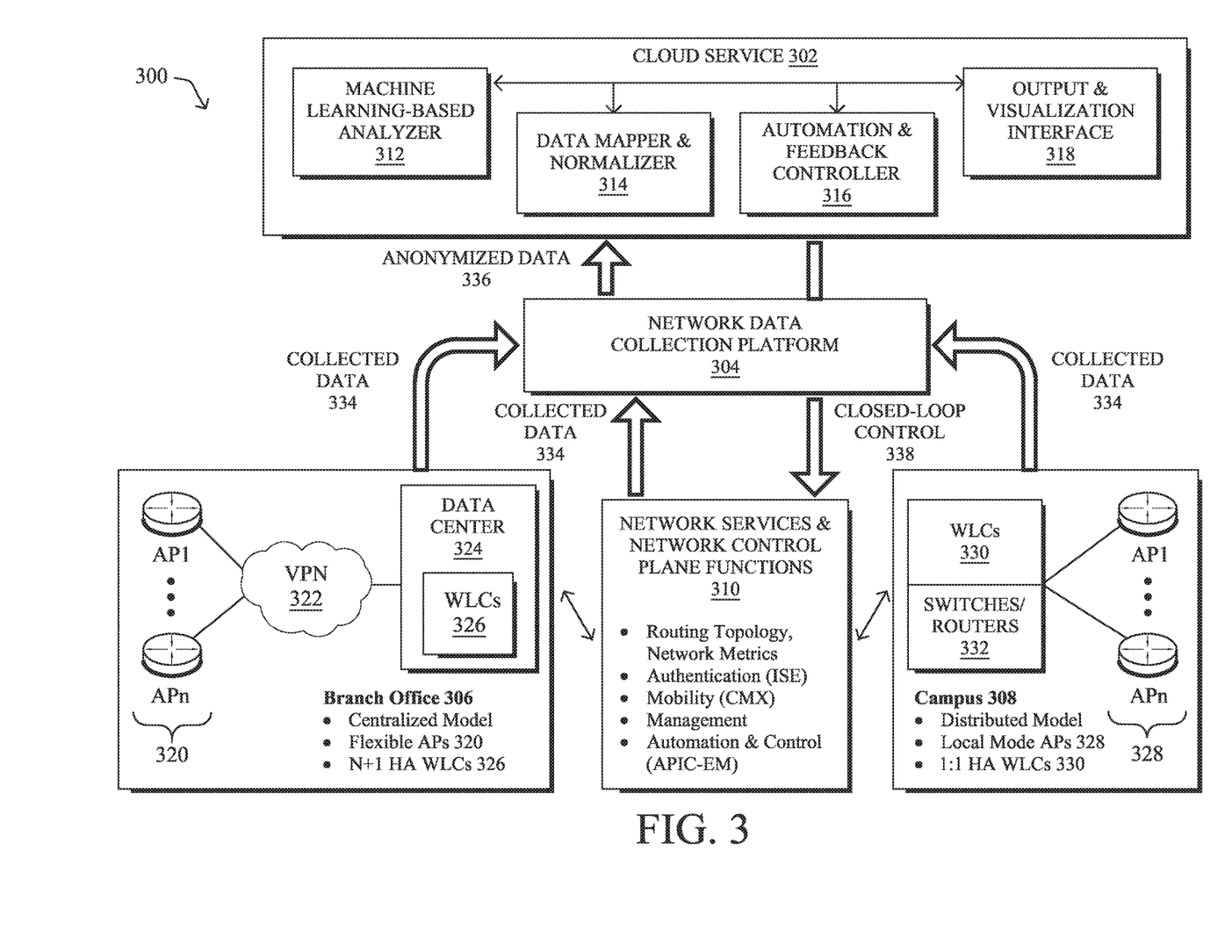
FIG. 3 illustrates an example network assurance system.

FIG. 3 illustrates an example network assurance system 300, according to various embodiments. As shown, at the core of network assurance system 300 may be a cloud service 302 that leverages machine learning in support of cognitive analytics for the network, predictive analytics (e.g., models used to predict user experience, etc.), troubleshooting with root cause analysis, and/or trending analysis for capacity planning. Generally, architecture 300 may support both wireless and wired network, as well as LLNs/IoT networks.

In various embodiments, cloud service 302 may oversee the operations of the network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point AP1 through nth access point, APn) through which endpoint nodes may connect. Access points 320 may, in turn, be in communication with any number of wireless LAN controllers (WLCs) 326 (e.g., supervisory devices that provide control over APs) located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point AP1 through nth access point APn) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc.

Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning (ML)-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc.). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint client device, networking device in branch office 306 or campus 308, or a network service or control plane function 310, to adjust its operations (e.g., by signaling an endpoint to use a particular AP 320 or 328, etc.).

As noted above, a key feature of network assurance cloud service 302 is its ability to leverage large datasets of measurements from a broad range of networks and across multiple organizations (e.g., businesses, schools, government entities, etc.). Doing so allows service 302 to tailor the machine learning models in its machine learning-based analyzer 312 to each network and/or organization. In other words, locating machine learning-based analyzer 312 in the cloud allows service 302 to:

Leverage both the network measurements for the specific organization under scrutiny, as well as measurements from any number of other networks or organizations, to train more accurate machine learning-based models in analyzer 312 for that organization. In other words, a cloud-based approach allows service 302 to apply cross-learning to the datasets from different networks or organizations.

Leverage the vast computational resources of the cloud, to accommodate for bursts in the computation requirements involved in model training.

Despite the benefits of a cloud-based network assurance service, there are certain situations in which a given network cannot use a cloud-based solution. For example, confidentiality requirements of the network may prevent data regarding the network to be sent to the cloud for analysis. In another example, it may not be practical to send the network measurements to the cloud for analysis, such as due to technical constraints. Thus, in some embodiments, some or all of network assurance service 300 shown in FIG. 3 may be implemented completely on premise so that little or no customer data is transmitted externally to the cloud.

In the case of an on-premise implementation of a network assurance service, a local agent may process telemetry data generated by the network using a pre-installed machine learning-based model. Since the telemetry data is not available to the cloud engine, and the on-premise agent typically does not have enough computational resources to train such a model using the local telemetry data, the pre-installed model may be computed in the cloud based on similar datasets and pushed to the local network for execution.

A hybrid approach to model training and deployment in a network assurance system is also possible. As opposed to sharing all on-premise telemetry data with the cloud-based service, or sharing none of the data at all, a hybrid approach can also be taken whereby only a limited amount of the telemetry data is reported. For example, it may be acceptable in certain situations to share a limited amount of telemetry data, especially if the data is property anonymized. Indeed, a key limitation of the no-sharing approach is that the model pushed from the cloud for on-premise execution is often suboptimal in terms of performance, even if optimized for a specific vertical and/or type of network. Even if multiple candidate models are pushed to the on-premise instance, the likelihood to have a "good fit" is not a given, and may vary greatly, given the humongous size of the model space.

Accordingly, in both the hybrid and on-premise deployment scenarios, the following challenges arise:

Data Integrity and Consistency: Configuration changes and software upgrades in a network can sometimes alter the dynamics of the exported telemetry data for some particular variables, negatively affecting model performance. For example, a configuration change could affect the frequency at which a statistic is captured or reported to the model for analysis (e.g., enabling or disabling Application Visibility and Control statistic computation in devices that support NBAR, etc.). Similarly, a software upgrade may change the semantics of an exported variable, impinging on the performance of the model assessing that variable.

Model Selection for On-Premise Deployment—In addition to changes to the network environment, the capability of the model computed by the cloud service to accurately reflect the behavior of the on-premise network depends on how statistically similar the training dataset in the cloud is to the actual telemetry data in the network. In some cases, the cloud service may have little to no access to the actual telemetry data of the network meaning that the on-premise model will operate in isolation. When this happens, the cloud service will have no visibility into the performance of the model, nor be able to actively verify a posteriori the performance of the model selected for on-premise deployment. Also, depending on the nature of the chosen model (e.g., type of input features, temporal granularity etc.), the computational requirements of the model evaluation can change dramatically. Therefore, the choice of the model should also take into account the amount of resources available on the on-premise platform. In other words, the model accuracy/footprint trade off should be dynamically tuned by the cloud service to account for the available on-premise resources, which can also be a function of which services/mechanisms are also available on-premise (e.g., CMX, Fusion, etc.).

As noted above, data integrity and correctness are crucial to the proper functioning of a machine learning model. Indeed, data falling out of the hyperspace region in which the model had been trained could result in an unpredictable output behavior. This is particularly true for non-linear models, such as neural network-based models. Also, the presence of incorrect data in the training dataset used to train the model can have an impact on its performance. For example, assume that the model is to assess onboarding times in a wireless network. If the training dataset used to train the model comprises reports of unrealistically large onboarding times, the model will fit the data such that the very large onboarding times are considered as normal, which will impact the ability of the model to detect onboarding anomalies.

Data incorrectness in the training dataset is often due to bugs or misconfigurations of the data source. Once discovered, the source has to be patched or reconfigured, which can be quite a lengthy process (e.g., if the data source is not co-located with the model, if the data source and the model have different administrators, etc.). Notice that the output of the model will be unreliable until the data source is fixed.

The machine learn g-based model will also typically have a large number of available tuning parameters. Besides the specific parameters of the machine learning algorithm (e.g. the number of layers in a neural network, etc.), further model parameters include the various measurements/data from the training dataset on which the model was trained, as well as the conditions for the model to raise an alert/trigger. For example, the model may be configured to raise a particular alarm, depending on contextual information, such as the number of clients/locations impacted by an issue. As used herein, "model settings" generally refer to the collection of all parameters associated with the model.

The effect of changing some of the model parameters is hard to know a priori, given the highly non-linear effects of many forms of machine learning models, such as ANNs and the fact that the notion of an 'anomaly' is largely subjective.

Model Training for On-Premise Execution in a Network Assurance System

The techniques introduced herein support the training of a machine learning model for local/on-premise execution within the network being assessed by the model. In some aspects, the techniques allow for model performance to first be evaluated in the cloud for each possible configuration. Once the model is deployed for on-premise execution, the techniques herein further introduce a feedback loop whereby the performance of the model is monitored over time and the model selection process restarted if the network conditions undergo significant changes (e.g., the traffic in the network, etc.). In further aspects, the techniques herein also introduce a data filtering mechanism able to filter out model training data attributable to a data source bug. In yet another aspect, a monitoring mechanism is introduced that evaluates the impact of such faulty data on any already-deployed models, allowing for the triggering of either model retraining or model reselection.

Specifically, according to one or more embodiments of the disclosure as described in detail below, a network assurance service maintains a data lake of network telemetry data obtained by the service from any number of computer networks. The service generates a machine learning model for on-premise execution in a particular computer network to detect network issues in the particular network. To do so, the service repeatedly selects a candidate set of model settings based in part on the data lake of network telemetry data, trains a machine learning model using network telemetry data from the data lake that matches the candidate set of model settings, and tests performance of the trained model using an emulator that emulates network issues in the particular network. The service further deploys the generated machine learning model to the particular computer network for on-premise execution.

Illustratively, the techniques described herein may be performed by hardware, software, and/or firmware, such as in accordance with the network assurance process 248, which may include computer executable instructions executed by the processor 220 (or independent processor of interfaces 210) to perform functions relating to the techniques described herein.

Figure 4:
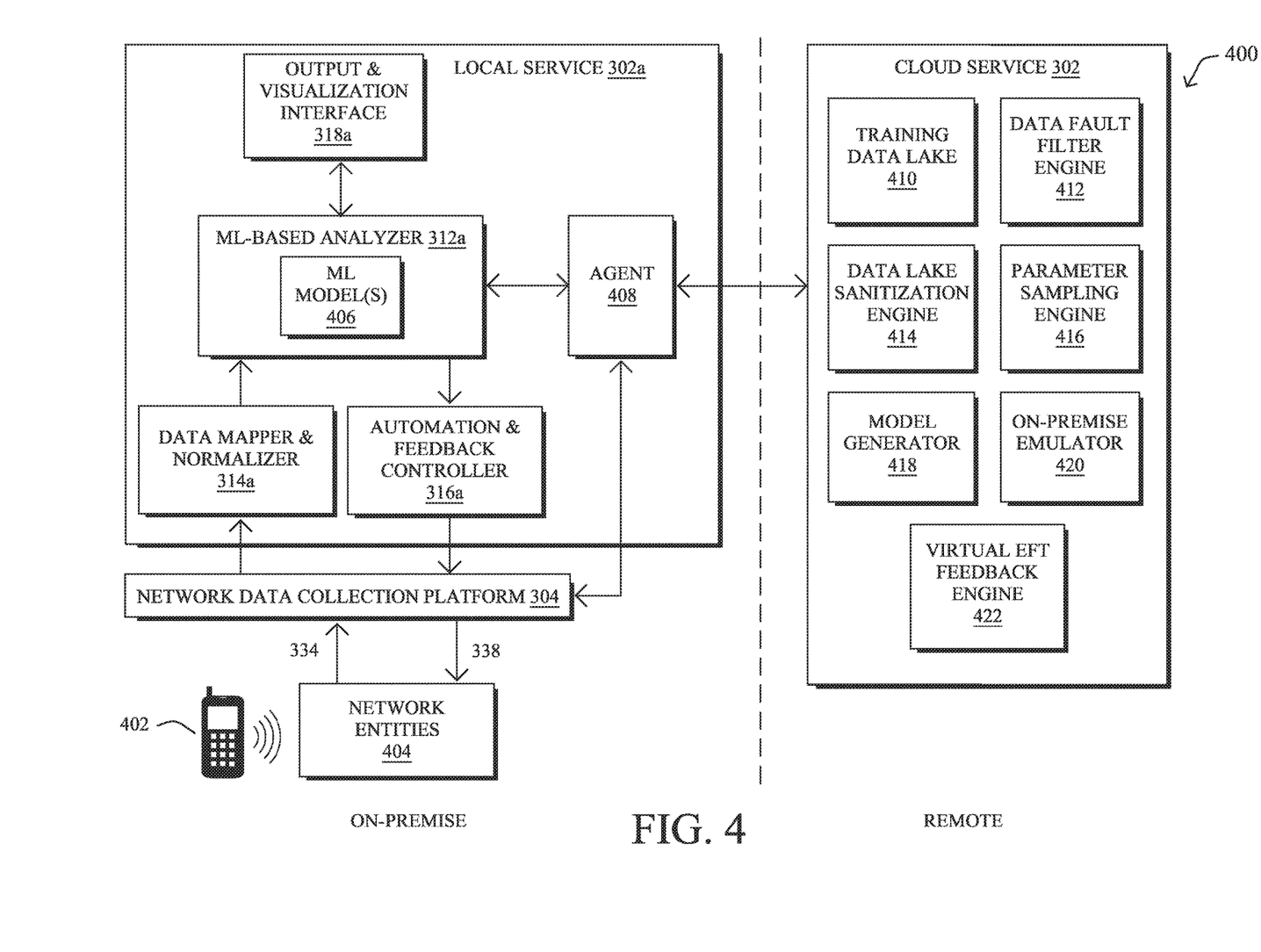
FIG. 4 illustrates an example architecture for training a machine learning model for on-premise execution.

Operationally, FIG. 4 illustrates an example architecture 400 for training a machine learning model for on-premise execution in a network, according to various embodiments. As shown, any or all of the components of network assurance system 300 may be implemented on-premise, as part of the local network to be monitored. For example, assume that the local network comprises any number of network elements/entities 404 that communicate with one or more client devices 402 within the monitored network itself. Network entities 404 may include, but are not limited to, radios, APs, WLCs, routers, switches, servers, or the like. On top of network entities 404 may be network data collection platform 304 that gathers measurements/telemetry data 334 from network entities 404, either directly on network entities 404 or on devices in communication therewith.

In various embodiments, a local service 302a may also be implemented on-premise in the local network, to assess the telemetry data 334 collected locally by network data collection platform 304. In general, local service 302a may include any or all of the components 312a-318a of cloud service 302 to perform the functions described above, locally within the monitored network. For example, local service 302a may be implemented on one or more devices of the local network, allowing service 302a to assess the collected telemetry data 334 locally/on-premise using any number of machine learning-based models 406, and without having to send these measurements to the external cloud service 302 for assessment. In addition, in some cases, any alerts raised by local service 302a based on the outputs of model(s) 406 may be provided by output and visualization interface 318a to a user interface for review.

As shown in FIG. 4, local service 302a may also include an agent 408 configured to communicate with cloud service 302 that operates as a supervisory network assurance service for local service 302a. In various embodiments, cloud service 302 may include any or all of the components described previously with respect to FIG. 3 (e.g., an analyzer 312, a data mapper and normalizer 314, etc.) and/or any of the components shown. Such components may include a training data lake 410, a data fault filter engine 412, a data lake sanitization engine 414, a parameter sampling engine 416, a model generator 418, an on-premise emulator 420, and/or a virtual early field trial (EFT) feedback engine 422. These components 410-420 can be combined or omitted, as desired, during implementation. In addition, components 410-422 may be implemented on a singular device that provides service 302 or implemented in a distributed manner.

During operation, agent 408 of local service 302a may be responsible for any or all of the following tasks:

Installing and updating the machine learning model(s) 406 executed on-premise and trained in the cloud by service 302.

Providing network telemetry data collected by network data collection platform 304 to cloud service 302. In some cases, any telemetry data sent from agent 408 to cloud service 302 may be anonymized, first, so as to preserve the privacy of the local, on-premise network. In further embodiments, this functionality may be omitted.

Providing examples of network issues observed in the local, on-premise network to service 302. For example, in the case of the local network being a wireless network, these network issues may be indicative of excessive onboarding times observed in the network and/or onboarding failures, the number of clients attempting to onboard to the network, throughput issues, Authorization and Accounting (AAA) failures, and/or Dynamic Host Configuration Protocol (DHCP) errors. The examples provided by agent 408 may also include network telemetry data associated with these issues, in some cases.

Providing data regarding bugs and/or corrective measures in the local/on-premise network. For example, agent 408 may provide service 302 a listing of the configurations of network entities 404, such as when they are patched for certain bugs, their current software versions, etc.

According to various embodiments, cloud service 302 may be configured to evaluate different combinations of model settings, to generate and provide machine learning model 406 for on-premise execution by local service 302a. As noted previously, model settings can include both the input parameters evaluated by the model, as well as those that control the configuration of the model itself (e.g., the number of layers in a neural network, anomaly or alert thresholds, etc.). For example, the model settings may specify that the model should assess the number of clients attached to an AP, the bandwidth consumed by those clients, etc., as well as the minimum number of impacted clients/locations for the model to raise an issue alert. This allows cloud service 302 to select the best on-premise model according to different possible criteria. Since the evaluation of the quality of the different models can also be partially subjective, this procedure is also referred to herein as a virtual early field trial (EFT).

As shown, cloud service 302 may include a training data lake 410 that comprises network telemetry data obtained by cloud service 302 from any number of different networks. In some cases, this may include telemetry data 334 collected by network data collection platform 304 from the network of service 302a and reported to cloud service 302 via agent 408. The network telemetry data in training data lake 410 may also comprise telemetry data from any number of other networks.

In some instances, model generator 418 may initially generate/train a default machine learning model 406 for execution on-premise by local service 302a, using the network telemetry data in training data lake 410. For example, based on the configuration of the network of service 302a, such as the number of clients, APs, load, etc., cloud service 302 may select telemetry data in data lake 410 obtained from any number of other networks having a similar size and/or vertical (e.g., a hospital, a school, etc.), to train the default model 406 pushed to local service 302a.

In order to generate a more tailored machine learning model 406 for on-premise execution by local service 302a, model generator 418 may coordinate with agent 408 to export the input and/or output data of the current model 406 to cloud service 302 for inclusion in training data lake 410. For example, in the case in which cloud service 302 first deploys a default model 406 to local service 302a for execution, agent 408 may then send the telemetry data used as input to the default model to cloud service 302. Agent 408 may further provide the outputs of the default model 406 to cloud service 302, as well, such as data regarding any network issues detected by the default model 406. Overall, the purpose of this mechanism is for cloud service 302 to gather a representative data set from the network, to allow cloud service 302 to evaluate different model settings.

The export of the above data from local service 302a to cloud service 302 may be performed on a push and/or pull basis. For example, in some cases, cloud service 302 may coordinate with agent 408 to periodically export the data to service 302 such as at specific times of the day, days of the week, peak days, etc. In some embodiments, this export mechanism can also be dependent on the completeness of the data in data lake 410, as well. For example, assume that the telemetry data exported by agent 408 is missing data captured during weekends. In such a case, cloud service 302 may send a request to agent 408 to initiate the collection and reporting of this data, so as to 'fill in' any gaps in data lake 410.

In a further embodiment, agent 408 may employ a data filter to select the data of interest for inclusion in data lake 410 of cloud service 302. For example, this filter may take the form of a compact, machine learning-based representation of the dataset already in training data lake 410. Indeed, many existing machine learning techniques allow for a dataset to be represented in a more compact way, which agent 408 can filter data out for export to cloud service 302 that would be redundant to data lake 410 or of low value to model generator 418 for purposes of training a model 406. For example, in one embodiment, such a filter may take the form of an anomaly detection model trained using the data in data lake 410. By using such a filter, agent 408 may only report telemetry data to service 302 that is unexpected/anomalous in view of the existing data points in data lake 410. Such a filter can also be updated periodically, to reflect the latest distribution in data lake 410.

Once sufficient telemetry data points have been collected from the network of service 302a, cloud service 302 may begin testing different sets of model settings, to generate a machine learning model 406 optimized for that network. To this end, parameter sampling engine 416 may create a set of candidate model settings, which may include both domain specific parameters and pure machine learning configuration parameters, on which model generator 418 may train a candidate model. In some embodiments, the settings selected by parameter sampling engine 416 may be based in part on input obtained by cloud service 302 from a user interface. This allows a human expert to specify the possible values of the parameters to be checked. In another embodiment, parameter sampling engine 416 could also programmatically sample the space of possible parameters, including those possible inputs from training data lake 410, to create the set of candidate model settings.

Once parameter sampling engine 416 has selected a candidate set of model parameters, model generator 418 may use the corresponding data in training data lake 410 to train a candidate machine learning model. Model generator 418 may do so any number of times using different sets of candidate model parameters selected by parameter sampling engine 416. In turn, cloud service 302 may select one of the trained models for on-premise execution by local service 302a and deploy the selected model as a model 406 executed by ML-based analyzer 312a of local service 302a.

In various embodiments, the selection of a trained candidate model for deployment to service 302a by cloud service 302 may be based in part on a performance evaluation of the different candidate models. To this end, cloud service 302 may include an on-premise emulator 420 whose goal is to reproduce exactly the same network issues that would be detected in the network of local service 302a. In other words, on-premise emulator 420 may test a model trained by model generator 418 using the same parameter settings and input data as would be used by service 302a on-premise. For example, on-premise emulator 420 may include the same extract, transform, load (ETL) mechanisms as that of service 302a, such as data mapper and normalizer 314a, etc. In addition, on-premise emulator 420 may also include the same prediction engine (e.g., analyzer 312a) as that of local service 302a and the same issue detection criteria used by the prediction engine (e.g., issues or triggers, potentially augmented with additional information, such as the impacted locations/clients, etc.).

Virtual EFT feedback engine 422 may operate in conjunction with on-premise emulator 420 to assign a score to each of the candidate models generated by model generator 418 for each of the candidate sets of model settings. Such a score may be purely objective, in some cases. For example, engine 422 may assign a score to a particular model based on the number or frequency of the model to detect network issues emulated by emulator 420. In further embodiments, the score assigned by feedback engine 422 may be based in part, or in whole, on feedback provided to cloud service 302 via a user interface. For example, service 302 may provide the results of emulator 420 to the user interface and, in turn, the user may score each of the models. Regardless of the scoring approach taken, cloud service 302 may then select the candidate model with the highest score (or lowest, depending on the scale)), and deploy the selected model 406 to local service 302a via agent 408. In turn, analyzer 312a may begin executing the deployed model 406, to analyze the performance of the local, on-premise network.

After deploying the model 406, virtual EFT feedback engine 422 may also periodically re-active the EFT process, to ensure that the quality of the issues detected on-premise by the deployed model 406 is not decreasing. To do so, feedback engine 422 may poll, via agent 408, the issues raised by analyzer 312a using the deployed model 406 and rate them. This can be done either manually by an expert via a user interface, automatically by engine 422, or both. In cases in which the issue score of the deployed model 406 is significantly lower than that of the previous model 406 (i.e., below a defined threshold), feedback engine 422 may restart the model generation and deployment process, in an attempt to correct this condition.

An assumption thus far has been that the training data in training data lake 410 was generated by error-free data sources. In reality, though, any bugs/errors on the part of source of the telemetry data can negatively impact the resulting machine learning model 406. For example, assume that the on-premise network is a wireless network and the telemetry data in training data lake 410 includes records of onboarding times greater than three minutes when client devices 402 are roaming. Further, assume that such a condition is not possible under the current network settings of the network (e.g., an onboarding time greater than one minute may be considered dropped/failed, etc.). Accordingly, these records can impact the model 406 in the following ways:

- The bug-attributable telemetry data in training data lake 410 may result in the model 406 being trained on incorrect data. For example, in the above case, the generated model 406 may learn that onboarding times of up to three minutes are "normal" network behavior, negatively impacting the ability of the model to detect onboarding issues.
- The underlying bug in the source network entity 404 may cause that source device (e.g., an SNMP source, etc.) to continue exporting inaccurate network telemetry data until it is patched. This means that any analysis of such telemetry data by a deployed model 406 may likewise lead to poor model performance.

According to various embodiments, cloud service 302 may include a data fault filter engine 412 that is configured to create a description of faulty/incorrect telemetry data associated with a bug, misconfigured network entity, or the like. Such a filter description can then be used by data lake sanitization engine 414 to filter the portion of the telemetry data in training data lake 410 from being used by model generator 418 to train a machine learning model. For example, assume that the filter description of data fault filter engine 412 indicates that any telemetry data records in data lake 410 regarding onboarding times of greater than 200 seconds be excluded from training.

Data fault filter engine 412 may generate a filter definition in a number of different ways. In one embodiment, the filter may be defined for filter engine 412 manually by an expert via a user interface. For example, an expert may specify a set of rules that allow filter engine 412 to detect faulty input data, along with a set of actions to remove of correct the faulty data value itself. In another embodiment, filter creation can be automated by filter engine 412 using a simple, machine learning model. For example, filter engine 412 may frame the problem as a classification problem and use a machine learning classifier, such as a regression method, to label samples in data lake 410 as either 'normal' or 'faulty/bug-associated.'

In a further embodiment, data fault filter engine 412 may deploy its defined filter to the on-premise agents responsible for exporting captured network telemetry data to cloud service 302. For example, filter engine 412 may also deploy its data filter to agent 408 of local service 302*a*, to filter any faulty data from being reported to cloud service 302. In yet another embodiment, the filtering by data fault filter engine 412 may be applied to any data reported to cloud service 302 and prior to storage in data lake 410.

Data lake sanitization engine 414 of cloud service 302 may be configured to assess the impact of the data bug on the currently deployed models 406 and to ensure that the faulty data associated with the bug is excluded from being used by model generator 418 during the next iteration of model training. Note that updating the deployed machine learning models 406 across a large set of networks could be impractical and cause an excessive amount of downtime of the network analyzers, such as analyzer 312*a*. Thus, model retraining and re-deployment may only be performed by cloud service 302 when the performance increase exceeds a threshold amount.

Said differently, data fault filter engine 412 and data lake sanitization engine 414 may operate as follows. In a first step, data lake sanitization engine 412 will apply its data fault filter to training data lake 410 used by model generator 418 to generate the machine learning models 406 for on-premise execution. In a second step, data lake sanitization engine 414 will then initiate retraining of any previously deployed models 406 using the sanitized training data and re-deploy the newly trained model, if its performance increase exceeds a predefined threshold. Note also that the portion of data lake 410 used by model generator 418 to train a model should not overlap the data used by on-premise emulator 420 to test such a model.

As would be appreciated, the model training and retraining approaches using the sanitized/filtered data from data lake 410 can also be performed in conjunction with the above model settings optimization techniques herein. In such cases, parameter sampling engine 416 may still select sets of candidate model settings and model generator 418 may train candidate models, but using training data from data lake 410 that has first been filtered/sanitized by data lake sanitization engine 414. In turn, the candidate models can be evaluated using on-premise emulator 420 also using sanitized/filtered data from data lake 410 and scored by virtual EFT feedback engine 422 for selection and deployment to local service 302*a* for on-premise execution.

In some embodiments, virtual EFT feedback engine 422 may compare the performance of a candidate model trained by model generator 418 using the filtered training data to that of the previously deployed model 406. Such a test may entail comparing the issues raised by the new model from on-premise emulator 420 to the actual issues raised by the previously deployed model 406 in the on-premise network. This can be done, for example, by having agent 408 report data regarding any network issues detected by analyzer 312*a* to cloud service 302. If this is not allowed or possible, feedback engine 422 may instead leverage on-premise emulator 420 to evaluate the performance of both models using, for example, non-sanitized data from data lake 410.

The decision to deploy an updated model to a given network may be done on a network-by-network basis. Accordingly, in some cases, cloud service 302 may retrain a separate model for each particular deployment network and individually decide whether to upgrade the previously deployed model or not. Multiple possible comparison criteria can also be used to make this decision, depending on the desired tradeoff between the cost of redeploying a new model and the performance improvement that would result. Possible criteria for this decision may include the difference between the number of issues generated by the prior and current models, whether the new model suppressed some false positives that were detected by the prior model, and/or whether the new model is still able to detect all of the significant issues detected by the prior model. Of course, the notion of issue 'significance' can be defined either subjectively (e.g., by a human expert via a user interface) or objectively (e.g., based on its distance from normal network behavior).

In another embodiment, an improvement metric to compare models can be computed by virtual EFT feedback engine 422 by attributing a numerical score to each of the detected anomalies (detected by either model), adding on the positive side the sum of the scores of the new anomalies detected by the new model, and adding with negative sign the score of the anomalies which are no longer detected by the new model.

In addition, the final decision as to whether a deployed model 406 should be replaced/updated by cloud service 302 may be made manually or automatically, in various implementations. For example, cloud service 302 may present data regarding the performances of the old and new models via a user interface, to allow a human expert to make the final deployment decision. Conversely, a threshold could be used by feedback engine 422 on the improvement metric, to determine whether to automatically deploy the new model for on-premise execution.

Further embodiments also provide for the data fault filter generated by data fault filter engine 412 to be deployed to local service 302*a*, such as when the previous model 406 is robust to the data issue. In another embodiment, cloud service 302 could also deploy both the data fault filter, as well as the newly generated model 406, to local service 302*a*. This allows local service 302*a* to filter out any telemetry data from assessment by a model 406, while also updating the model 406.

It should also be stressed that the virtual EFT mechanism introduced herein can be used not only to optimize the model for deployment, but also to assess the impact of a data bug, in further embodiments. For example, even if a particular data bug is not currently present in an on-premise deployment, the emulator for the environment can be used to evaluate the effects of the bug suddenly becoming present in the environment.

Figure 5:
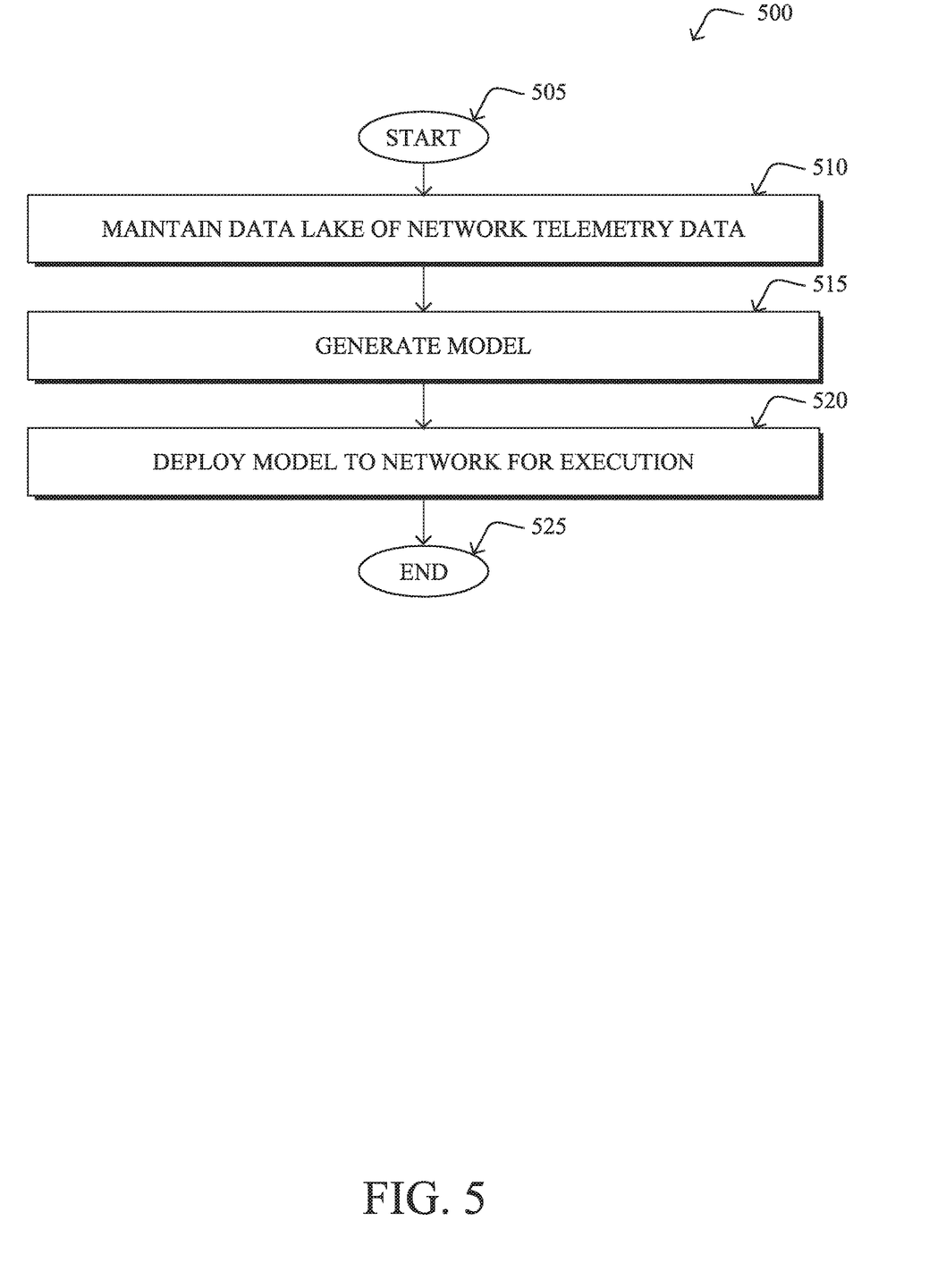
FIG. 5 illustrates an example simplified procedure for model training for on-premise execution.

FIG. 5 illustrates an example simplified procedure for model training for on-premise execution, in accordance with one or more embodiments described herein. For example, a non-generic, specifically configured device (e.g., device 200) may perform procedure 500 by executing stored instructions (e.g., process 248) to provide a network assurance service (e.g., service 302). The procedure 500 may start at step 505, and continues to step 510, where, as described in greater detail above, the network assurance service may maintain a data lake of network telemetry data obtained by the service from any number of computer networks. For example, the network telemetry data may be indicative of network performance (e.g., in terms of drops, delays, jitter, etc.), network states (e.g., number of clients, resource consumptions, etc.), network configurations, and/or network issues (e.g., errors or problems in the network). In some embodiments, the service may send a compact representation of the data lake to a computer network, whereby the compact representation of the data lake acts as a filter for network telemetry data exported by that network to the service. In a further embodiment, the service may also determine that a portion of the network telemetry data in the data lake is associated with a bug and filter that portion from being used by the service to train a machine learning model. In other words, in various embodiments, the data filtering may be performed on-premise to prevent export to the service, on receipt by the service and prior to storage in the data lake, and/or after entry into the data lake.

At step 515, as detailed above, the service may generate a machine learning model for on-premise execution in a particular computer network to detect network issues in the particular network. In various embodiments, the service may do so by repeatedly select a candidate set of model settings based in part on the data lake of network telemetry data, train a machine learning model using network telemetry data from the data lake that matches the candidate set of model settings, and test performance of the trained model using an emulator that emulates network issues in the particular network. For example, the candidate set of model settings may specify parameters for the model itself, such as a number of neural network layers, and/or the network telemetry parameters to be used as an input for the model (e.g., which telemetry parameters are to be used to train the model).

At step 520, the service may deploy the generated machine learning model to the particular computer network for on-premise execution, as described in greater detail above. In some embodiments, the service may do so by assigning a score to a trained model based in part on a number of emulated network issues detected by the trained model and/or based in part on user feedback. In turn, the service may compare the scores of its trained models to select one of the trained models for on-premise execution in the particular network based on its assigned score and deploy that model to the particular network. Procedure 500 then ends at step 525.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for a network assurance service to select the best configuration for a machine learning model for on-premise execution by systematically evaluating the performance of each possible configuration in the cloud. In further aspects, the techniques herein also provide for a feedback loop between the local analyzer that leverages the deployed model and the cloud service, so as to repeat the model selection procedure if the traffic in the network undergoes significant changes. In another aspect, the techniques herein also introduce a data filter that can be used to ensure that telemetry data attributable to a bug is not used to train a model and introduce a mechanism to evaluate the impact of such faulty data on any previously-deployed models. Based on this evaluation, an informed decision can be made as to whether the deployed model should be retrained and redeployed.

While there have been shown and described illustrative embodiments that provide for the deployment of a machine learning model for on-premise execution in a network, it is to be understood that various other adaptations and modifications may be made within the spirit and scope of the embodiments herein. For example, while certain embodiments are described herein with respect to using certain models for purposes of anomaly and issue detection, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:

maintaining, by a network assurance service, a data lake of network telemetry data obtained by the service from one or more computer networks;

generating, by the service, a machine learning model for on-premise execution in a particular computer network to detect network issues in the particular network by repeatedly:

selecting a candidate set of model settings based in part on the data lake of network telemetry data, training a machine learning model using network telemetry data from the data lake that matches the candidate set of model settings, and testing performance of the trained model using an emulator that emulates network issues in the particular network; and deploying, by the service, the generated machine learning model to the particular computer network for on-premise execution.

2. The method as in claim 1, wherein the candidate set of model settings is indicative of at least one of: a number of neural network layers for the machine learning model or a network telemetry parameter to be used as an input for the model.

3. The method as in claim 1, wherein maintaining the data lake of network telemetry data obtained by the service from one or more computer networks comprises:
sending a compact representation of the data lake to a computer network that acts as a filter for network telemetry data exported by that network to the service.

4. The method as in claim 1, wherein maintaining the data lake of network telemetry data obtained by the service from one or more computer networks comprises:
determining that a portion of the network telemetry data in the data lake is associated with a bug; and
filtering the portion of the telemetry data in the data lake associated with the bug from being used to train a machine learning model.

5. The method as in claim 4, further comprising:
re-generating the machine learning model for on-premise execution in the particular computer network, after filtering the portion of the telemetry data in the data lake associated with the bug from being used to train a machine learning model; and
deploying the re-generated machine learning model to the particular computer network for on-premise execution.

6. The method as in claim 1, wherein testing performance of the trained machine learning model using the emulator that emulates network issues in the particular network comprises:
assigning a score to the trained model based in part on a number of emulated network issues detected by the trained model.

7. The method as in claim 6, wherein the assigned score is based further in part on feedback received from a user interface.

8. The method as in claim 6, wherein generating the machine learning model for on-premise execution in the particular computer network comprises:
selecting the trained model for on-premise execution in the particular network based on its assigned score.

9. The method as in claim 1, wherein the particular computer network is a wireless network and the network issues comprise at least one of: onboarding issues, throughput issues, authentication issues, or Dynamic Host Configuration Protocol (DHCP) issues.

10. An apparatus, comprising:
one or more network interfaces;
a processor coupled to the network interfaces and configured to execute one or more processes; and
a memory configured to store a process executable by the processor, the process when executed configured to:
maintain a data lake of network telemetry data obtained by the service from one or more computer networks;
generate a machine learning model for on-premise execution in a particular computer network to detect network issues in the particular network by repeatedly:
selecting a candidate set of model settings based in part on the data lake of network telemetry data,
training a machine learning model using network telemetry data from the data lake that matches the candidate set of model settings, and
testing performance of the trained model using an emulator that emulates network issues in the particular network; and
deploy the generated machine learning model to the particular computer network for on-premise execution.

11. The apparatus as in claim 10, wherein the candidate set of model settings is indicative of at least one of: a number of neural network layers for the machine learning model or a network telemetry parameter to be used as an input for the model.

12. The apparatus as in claim 10, wherein the apparatus maintains the data lake of network telemetry data obtained by the service from one or more computer networks by:
sending a compact representation of the data lake to a computer network that acts as a filter for network telemetry data exported by that network to the service.

13. The apparatus as in claim 10, wherein the apparatus maintains the data lake of network telemetry data obtained by the service from one or more computer networks by:
determining that a portion of the network telemetry data in the data lake is associated with a bug; and
filtering the portion of the telemetry data in the data lake associated with the bug from being used to train a machine learning model.

14. The apparatus as in claim 13, wherein the process when executed is further configured to:
re-generate the machine learning model for on-premise execution in the particular computer network, after filtering the portion of the telemetry data in the data lake associated with the bug from being used to train a machine learning model; and
deploy the re-generated machine learning model to the particular computer network for on-premise execution.

15. The apparatus as in claim 10, wherein testing performance of the trained machine learning model using the emulator that emulates network issues in the particular network comprises:
assigning a score to the trained model based in part on a number of emulated network issues detected by the trained model.

16. The apparatus as in claim 10, wherein the process when executed is further configured to:
filter telemetry data associated with a bug from being added to the data lake.

17. The apparatus as in claim 10, wherein the apparatus generates the machine learning model for on-premise execution in the particular computer network by:
selecting the trained model for on-premise execution in the particular network based on its assigned score.

18. The apparatus as in claim 10, wherein the particular computer network is a wireless network and the network issues comprise at least one of: onboarding issues, throughput issues, authentication issues, or Dynamic Host Configuration Protocol (DHCP) issues.

19. A tangible, non-transitory, computer-readable medium storing program instructions that cause a network assurance service to execute a process comprising:
maintaining, by the network assurance service, a data lake of network telemetry data obtained by the service from one or more computer networks;
generating, by the service, a machine learning model for on-premise execution in a particular computer network to detect network issues in the particular network by repeatedly:
selecting a candidate set of model settings based in part on the data lake of network telemetry data, training a machine learning model using network telemetry data from the data lake that matches the candidate set of model settings, and testing performance of the trained model using an emulator that emulates network issues in the particular network; and deploying, by the service, the generated machine learning model to the particular computer network for on-premise execution.

20. The computer-readable medium as in claim 19, wherein maintaining the data lake of network telemetry data obtained by the service from one or more computer networks comprises:

determining that a portion of the network telemetry data in the data lake is associated with a bug; and filtering the portion of the telemetry data in the data lake associated with the bug from being used to train a machine learning model.

* * * * *

UNITED STATES PATENT AND TRADEMARK OFFICE
CERTIFICATE OF CORRECTION

PATENT NO. : 11,070,441 B2  
APPLICATION NO. : 16/578565  
DATED : July 20, 2021  
INVENTOR(S) : Andrea Di Pietro Page 1 of 1

It is certified that error appears in the above-identified patent and that said Letters Patent is hereby corrected as shown below:

In the Specification

Column 12, Line 13, please amend as shown:  
The machine learning-based model will also typically have Column 16, Line 27, please amend as shown:  
depending on the scale), and deploy the selected model 406

Signed and Sealed this  
Fifth Day of October, 2021

Drew Hirshfeld  
*Performing the Functions and Duties of the*  
*Under Secretary of Commerce for Intellectual Property and*  
*Director of the United States Patent and Trademark Office*